May 18, 1954  H. F. CARTER  2,679,015
EDDY CURRENT BRAKE, CLUTCH, OR THE LIKE
Filed April 21, 1952

Inventor:
Howard Frederick Carter,
by Richard E. Hosley
His Attorney.

Patented May 18, 1954

2,679,015

UNITED STATES PATENT OFFICE 2,679,015

EDDY CURRENT BRAKE, CLUTCH, OR THE LIKE

Howard F. Carter, Rugby, England, assignor to General Electric Company, a corporation of New York Application April 21, 1952, Serial No. 283,410

4 Claims. (Cl. 310—93)

My invention relates to eddy current devices and has particular significance in connection with eddy current brakes or clutches in which it is desired to absolutely lock the relatively rotatable members together so that there can be no movement of one with respect to the other.

In the past, eddy current devices have been characterized by the requirement that there must always be some relative rotation between the two principal members in order to generate the slip energy to cause braking or clutching effect.

It is an object of the present invention to provide an eddy current type brake or clutch in which the relatively movable members can be magnetically locked together.

A further object of the present invention is to provide in one unit the advantages of both an eddy current device and a device capable of achieving synchronous locking torque.

A further object of the present invention is to provide a device adapted for sequential operation to produce slip (eddy current) torque and synchronous (locking) torque.

In accordance with the illustrated embodiment of my invention, I provide an eddy current device in which the relatively movable members can be magnetically locked together by providing a rotor consisting of a cylindrical member of magnetic material having a radially enlarged portion intermediate its ends and in which a number of equi-spaced slots and formed around the periphery. This rotor cooperates with a stator consisting of two annular members having axially projecting portions extending into proximity to the enlarged portion of the rotor, with the inner peripheries of these projecting portions being in proximity to the remainder of the rotor and having slots cut in them. At their outer peripheries, the stator annular members are connected by a yoke and house a field exciting winding. In practicing my invention, in its broader aspects, it will occur to those skilled in the art that the relationship between the principal members may take various forms, and that the principles about to be disclosed are equally applicable to clutch operation as well as to brake operation.

Figure 1:
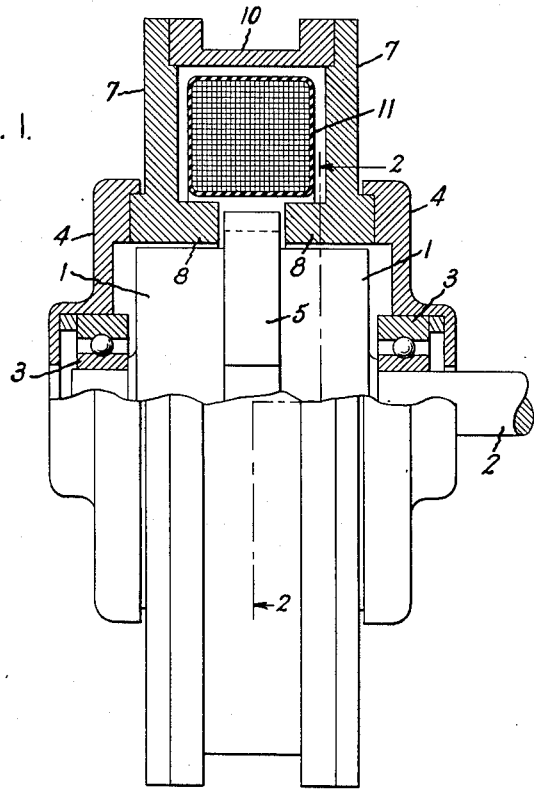
Figure 2:
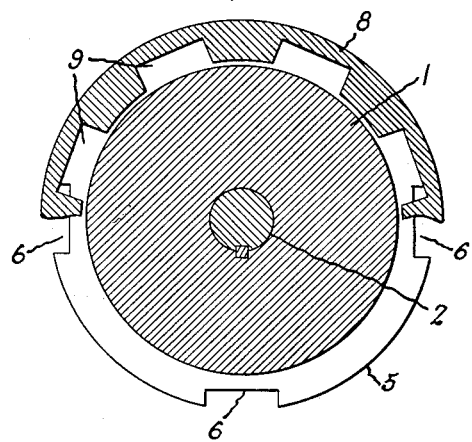

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which Fig. 1 is a side elevation, partly in section, of an eddy current brake having rotor and stator constructed in accordance with the invention; and Fig. 2 is a cross-sectional view of the rotor and a portion of the stator taken on the line 2—2 of Fig. 1.

Referring to the drawing, I have shown a rotor 1 which may consist of a solid cylindrical member of steel or other magnetic material. The rotor is shown keyed to a shaft 2 which is carried in bearings 3 supported in nonmagnetic end shield bearing housings 4. A portion 5 of the rotor is of larger diameter than the remainder and is provided with a number of equi-spaced slots 6. The stator comprises two annular magnetic material ring portions 7, which are provided at their radially inner peripheries with axially inwardly projecting portions 8 which extend into proximity to the enlarged portion 5 of the rotor. These portions 8 are provided with equi-spaced longitudinal slots 9 on the inner periphery thereof. It is not believed that the number of slots 9 is critical so long as this number is equal to, or a multiple of, the number of slots 6 in the rotor. Adjacent their outer peripheries, the rings 7 are held together by means of a yoke 10 which completes the magnetic circuit, and the space between the yoke and the projecting portions 8 houses a circular exciting winding 11.

In operation, the device functions as follows: when comparatively weak current is passed through the exciting winding, most of the magnetic flux passes from the stator radially across the axially extending air gap between the stator and the smooth portion of the rotor. As the current is increased, the smooth portion of the rotor tends to become saturated and a greater proportion of the flux passes axially across the radially extending air gap between the slotted portion 8 of the stator and the slotted portion 5 of the rotor, thus increasing the locking action between adjacent rotor and stator teeth until, for brake action the driving torque is finally overcome and the rotating member is arrested, or, for clutch action the members are rotating in synchronism.

The terms "rotor" and "stator" are used herein only relatively, for example to refer to inner and outer members, respectively, and it is to be understood that either or both of the principal members may be initially rotatable with respect to the other, or with respect to some fixed reference. Once the members are locked together, because of the increased exciting current passing flux from the teeth of one member to the teeth of the other, any torque difference must be increased considerably before there can again be relative rotation between the two members. Alternatively, with a constant driving torque applied to one member with respect to the other, the excitation current must be very considerably decreased before there can be relative rotation between the members.

There is thus provided a device of the character described capable of meeting the objects hereinabove set forth and combining in a single unit an eddy current device and a synchronous locking device. It will be obvious to those skilled in the art that the ratio between the locking and the eddy current brake control effects can be varied by altering the dimensions or the number of teeth on stator and rotor, or by altering the selection of magnetic material used for these members. Broadly speaking, the locking effect can be made a maximum and the eddy current braking effect a minimum by slotting the cylindrical portion of the rotor and providing the rotor and stator with the same number of slots.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the true spirit and scope of my invention.

What I claim as new and desire to secure by Letters Patent of the United States is:

1. An eddy current device comprising a rotor consisting of a cylindrical member of magnetic material having an enlarged peripheral portion intermediate its ends and in which a plurality of slots are formed, and a stator member comprising two ring portions arranged one on either side of said rotor enlarged portion, one of said ring portions having axially inwardly projecting portions separated by a plurality of slots and extending into proximity to said rotor enlarged portion, the inner peripheries of said ring portions being also in proximity to the cylindrical portions of said rotor on either side of said enlarged portion, a yoke member between the outer peripheries of said ring portions, and a circular exciting winding housed between said yoke and the axially inwardly projecting portions of said ring portions.

2. A device as described in claim 1, in which the number of slots on one of said ring portions and the number of slots on said enlarged peripheral portion have a relationship in which the number of slots on the member having the larger number of slots is an integral multiple of the number of slots on the member having the smaller number of slots.

3. In an eddy current device, the combination of two relatively rotatable magnetic members, one of said members constituted by a substantially uninterrupted smooth magnetic surface portion and a surface portion providing a set of equally spaced magnetic poles, the other of said members providing a set of equally spaced magnetic poles cooperating with said surface portions of said first-mentioned member to define an air gap therewith, and means for providing two levels of magnetic flux across said air gap to link said members together, said smooth portion being so arranged and constructed as to carry the greater portion of the low level of magnetic flux and to be saturated by the high level of flux to cause the greater portion of the high level flux to flow across the air gap between said magnetic poles to link corresponding poles of the two relatively rotatable members together for locking said members in synchronism.

4. An eddy current device comprising a rotor consisting of a cylindrical member of magnetic material having an enlarged peripheral portion intermediate its ends and in which a plurality of equally spaced magnetic poles are formed, and a stator member comprising two ring portions arranged one on either side of said rotor enlarged portion, each of said ring portions having axially inwardly projecting portions providing a plurality of equally spaced magnetic poles extending into proximity to said rotor enlarged portion, the inner peripheries of each of said ring portions being also in proximity to the cylindrical portions of said rotor on either side of said enlarged portion, a yoke member between the outer peripheries of said ring members and a circular exciting winding housed between said yoke and the axially inwardly projecting portion of said ring portions.

References Cited in the file of this patent
UNITED STATES PATENTS

| Number | Name | Date |
|---|---|---|
| 2,071,943 | Fraser | Feb. 23, 1937 |
| 2,373,609 | Stahl | Apr. 10, 1945 |
| 2,492,776 | Winther | Dec. 27, 1949 |

FOREIGN PATENTS

| Number | Country | Date |
|---|---|---|
| 3,910 | Great Britain | of 1915 |
| 931,221 | Great Britain | Sept. 29, 1947 |